US012337898B2

(12) United States Patent
Yamaguchi et al.

(10) Patent No.: US 12,337,898 B2
(45) Date of Patent: Jun. 24, 2025

(54) BODY FRAME MEMBER AND METHOD FOR MANUFACTURING BODY FRAME MEMBER

(71) Applicant: PRESS KOGYO CO., LTD., Kanagawa (JP)

(72) Inventors: Kazuhiro Yamaguchi, Kanagawa (JP); Shuichi Okawa, Kanagawa (JP)

(73) Assignee: PRESS KOGYO CO., LTD., Kanagawa (JP)

( * ) Notice: Subject to any disclaimer, the term of this patent is extended or adjusted under 35 U.S.C. 154(b) by 233 days.

(21) Appl. No.: 17/465,677

(22) Filed: Sep. 2, 2021

(65) Prior Publication Data

US 2022/0063724 A1 Mar. 3, 2022

(30) Foreign Application Priority Data

Sep. 3, 2020 (JP) ................................. 2020-148110

(51) Int. Cl.
*B62D 21/00* (2006.01)
*B21D 53/88* (2006.01)
*B62D 29/00* (2006.01)

(52) U.S. Cl.
CPC .............. *B62D 21/00* (2013.01); *B21D 53/88* (2013.01); *B62D 29/001* (2013.01)

(58) Field of Classification Search
CPC ....... B62D 21/152; B21D 22/26; B21D 53/88
See application file for complete search history.

(56) References Cited

U.S. PATENT DOCUMENTS 1,978,055 A * 10/1934 Mckinley ............... B62D 21/00
52/630
2,077,454 A * 4/1937 Almdale ................ B21D 53/88
280/787

(Continued)

FOREIGN PATENT DOCUMENTS

JP H10147255 A * 6/1998
JP 2006-272413 A 10/2006

(Continued)

OTHER PUBLICATIONS

JP-7200551-B2 Machine Translation (Year: 2023).*

(Continued)

*Primary Examiner* — Michael W Hotchkiss
(74) *Attorney, Agent, or Firm* — Nath, Goldberg & Meyer; Joshua B. Goldberg (57) ABSTRACT

Provided are a body frame member capable of suppressing deformation due to springback, and a method for manufacturing the same. The body frame member 1 of the present invention is formed in a substantially U shape by a web 2 extending in a front-rear direction of a vehicle body, an upper flange 3 extending inward in a vehicle width direction from an upper end of the web 2 and a lower flange 4 extending inward in the vehicle width direction from a lower end of the web 2, and comprises a kick-up portion 5 bent in the vertical direction of the vehicle body, and a convex portion 21 protruding outward or inward in the vehicle width direction is integrally formed from the upper end to the lower end of the web 2 at a portion of the web 2 where the kick-up portion 5 is provided.

1 Claim, 8 Drawing Sheets (56) References Cited

U.S. PATENT DOCUMENTS

| | | | | |
|---|---|---|---|---|
| 2,136,122 A * | 11/1938 | Almdale | ................ | B62D 21/00 |
| | | | | 280/797 |
| 5,381,871 A * | 1/1995 | Ohta | .................... | B62D 21/155 |
| | | | | 296/187.11 |
| 5,855,394 A * | 1/1999 | Horton | ................ | B62D 25/00 |
| | | | | 296/204 |
| 6,354,654 B2 * | 3/2002 | Lee | ........................ | B62D 21/02 |
| | | | | 296/205 |
| 8,562,068 B2 * | 10/2013 | Yoshida | ............... | B62D 21/152 |
| | | | | 296/187.11 |
| 9,340,237 B2 * | 5/2016 | Kurokawa | ........... | B62D 29/005 |
| 9,731,339 B2 * | 8/2017 | Miyagi | .................. | B21D 22/20 |
| 9,868,145 B2 * | 1/2018 | Suzuki | .................. | B21D 22/00 |
| 9,962,752 B2 * | 5/2018 | Uchiyama | .............. | B21D 53/88 |
| 10,118,645 B2 * | 11/2018 | Von Watzdorf | ........ | B21D 53/88 |
| 11,517,954 B2 * | 12/2022 | Kubo | ................... | B21D 53/88 |
| 2007/0107819 A1 * | 5/2007 | Gehringhoff | ........... | C23C 10/02 |
| | | | | 148/648 |
| 2011/0172803 A1 * | 7/2011 | Suzuki | .................. | B21D 22/00 |
| | | | | 703/2 |
| 2011/0272969 A1 * | 11/2011 | Mori | ....................... | B62D 21/10 |
| | | | | 296/193.07 |
| 2012/0074732 A1 * | 3/2012 | Yoshida | ............... | B62D 21/152 |
| | | | | 296/193.07 |
| 2012/0171506 A1 * | 7/2012 | Futatsuka | .............. | B21D 5/015 |
| | | | | 428/577 |
| 2015/0175208 A1 * | 6/2015 | Kuwayama | ........... | B62D 21/02 |
| | | | | 296/187.09 |
| 2015/0197289 A1 * | 7/2015 | Kurokawa | ........... | B62D 29/004 |
| | | | | 296/187.08 |
| 2015/0224563 A1 * | 8/2015 | Aso | ........................ | B62D 25/08 |
| | | | | 428/595 |
| 2015/0336619 A1 * | 11/2015 | Tanaka | ................... | B21D 53/88 |
| | | | | 296/193.06 |
| 2016/0016609 A1 * | 1/2016 | Kurokawa | ............. | B62D 21/15 |
| | | | | 296/203.01 |
| 2016/0236715 A1 * | 8/2016 | Kurokawa | ........... | B62D 29/041 |
| 2016/0296989 A1 * | 10/2016 | Nishimura | ............. | B21D 22/26 |
| 2018/0029645 A1 * | 2/2018 | Von Watzdorf | ...... | B62D 29/007 |
| 2018/0037075 A1 * | 2/2018 | Chang | ...................... | B60D 1/48 |
| 2018/0126435 A1 * | 5/2018 | Egawa | .................... | B23P 15/00 |
| 2021/0023601 A1 * | 1/2021 | Kariyazaki | ............ | B21D 17/02 |
| 2021/0114075 A1 * | 4/2021 | Miyake | .................. | B21D 22/26 |

FOREIGN PATENT DOCUMENTS

| | | | | | |
|---|---|---|---|---|---|
| JP | | 2008-213028 A | | 9/2008 | |
| JP | | 2012121377 A | * | 6/2012 | |
| JP | | 2013-027912 A | | 2/2013 | |
| JP | | 2013-202665 A | | 10/2013 | |
| JP | | 7200551 B2 | * | 1/2023 | ............. B21D 17/02 |
| WO | WO-2018030240 A1 | | * | 2/2018 | ............. B21D 22/20 |

OTHER PUBLICATIONS

JP-2012121377-A Machine Translation (Year: 2012).*
WO-2018030240-A1 Machine Translation (Year: 2018).*
JPH10147255A Translation (Year: 1998).*
Figure A, Annotation of McKinley Figure 4 (Year: 2024).*
Notice of Reason of Refusal dated Nov. 15, 2023 issued in corresponding Japanese Application No. 2020-148110.
Decision of Refusal dated Apr. 25, 2024 issued in corresponding Japanese Application No. 2020-148110.

* cited by examiner

View X

A-A CROSS SECTION

OUTER SIDE IN THE VEHICLE WIDTH DIRECTION ←----→ INNER SIDE IN THE VEHICLE WIDTH DIRECTION

BODY FRAME MEMBER AND METHOD FOR MANUFACTURING BODY FRAME MEMBER

BACKGROUND

Technical Field

The present invention relates to a body frame member for a vehicle body frame and a method for manufacturing the same.

Related Art

Conventionally, a member having a substantially U-shaped cross section, such as a side member, has been known as a body frame member constituting a vehicle body frame. FIGS. 5A-1 and 5B-1 show an example of a conventional body frame member. Here, FIG. 5A-1 is a perspective view from above of a conventional body frame member 101, and FIG. 5B-1 is a perspective view from below. As shown in the FIGS., the body frame member 101 is formed in a substantially U shape by a web 102 arranged in the vertical direction and extended in the front-rear direction of a vehicle body, an upper flange 103 extending inward in a vehicle width direction from the upper end of the web 102, and a lower flange 104 extending inward in the vehicle width direction from the lower end of the web 102. Further, a kick-up portion 105 bent in a vertical direction of the vehicle body is provided at an intermediate portion in a length direction of the body frame member 101.

By the way, a member such as the body frame member 101 is generally manufactured by press molding by sandwiching a plate material between a pair of molding dies. Here, in a press-molded product having a curved flange surface such as the kick-up portion 105, a tensile stress is generated in a portion where the flange surface extends during molding, and a compressive stress is generated in a portion where the flange surface contracts. This point will be described with reference to FIG. 5.

Figure 5:
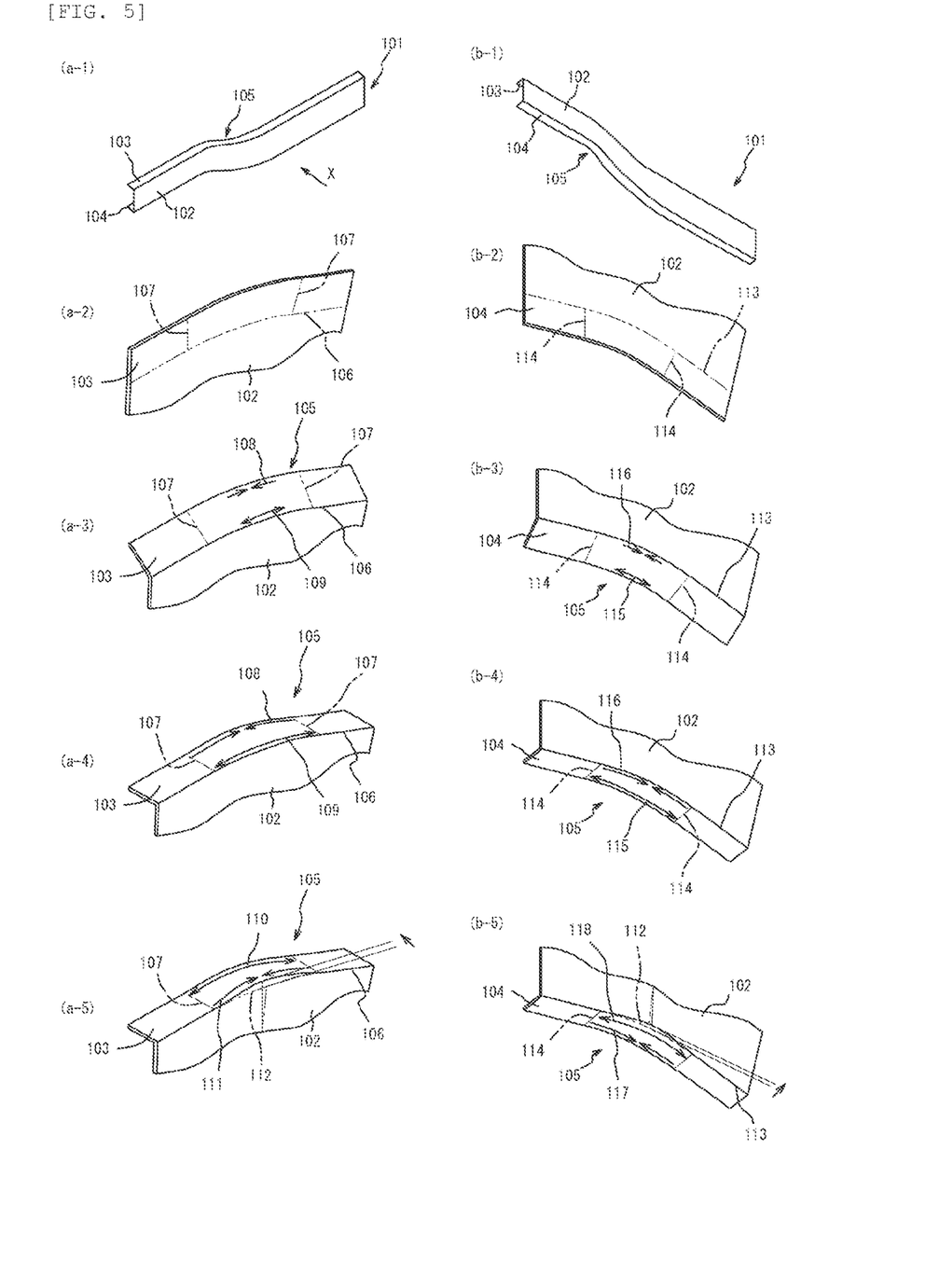
FIG. 5 is a diagram for explaining deformation of a conventional body frame member due to springback.

FIG. 5A-2 shows a periphery of the kick-up portion 105 of the upper flange 103 in the state before the plate material is bent. When the plate material is sandwiched between a pair the molding dies from the state shown in FIG. 5A-2, the plate material begins to bend as shown in FIG. 5-A3, and as shown in FIG. 5A-4, the web 102, the upper flange 103 and the kick-up portion 105 are formed. Note that reference numeral 106 in the FIGS. indicates a bent portion (a boundary portion between the web 102 and the upper flange 103), and reference numeral 107 indicates a flange surface change end portion (a boundary portion between a flat portion and a curved portion on the flange surface) of the upper flange 103.

When forming a member having a curved flange surface in this way, a compressive stress 108 is generated at a flange end portion on the flange surface of the upper flange 103, and a tensile stress 109 is generated between the flange surface change end portions 107 at the bent portion 106. On the other hand, after press molding, springback occurs, and the state changes from the state shown in FIG. 5A-4 to the state shown in FIG. 5A-5. That is, at the flange end portion of the upper flange 103, as shown in FIG. 5A-5, a springback 110 is generated outward in a longitudinal direction, and a springback 111 is generated inward in the longitudinal direction at the bent portion 106. Therefore, the web 102 is deformed inward in the vehicle width direction with respect to a target shape 112 around the upper flange 103.

On the other hand, in a vicinity of the kick-up portion 105 in the lower flange 104, when the plate material is bent as shown in FIGS. 5B-3 and 5B-4 from the state shown in FIG. 5B-2, stress in the direction opposite to that of the upper flange 103 is generated. That is, as shown in the FIGS., when a boundary portion between the web 102 and the lower flange 104 is a bent portion 113 and an end portion of the lower flange 104 where the flange surface changes is a flange surface changing end portion 114, a tensile stress 115 is generated at a flange end portion on a flange surface of the lower flange 104, and a compressive stress 116 is generated between the flange surface change end portions 114 at the bent portion 113. Then, as shown in FIG. 5B-5, after press molding, on the flange surface of the lower flange 104, a springback 117 is generated inward in the longitudinal direction at the flange end portion, and a springback 118 is generated outward in the longitudinal direction at the bent portion 113. Therefore, the web 102 is deformed outward in the vehicle width direction with respect to the target shape 112 around the lower flange 104.

Figure 6:
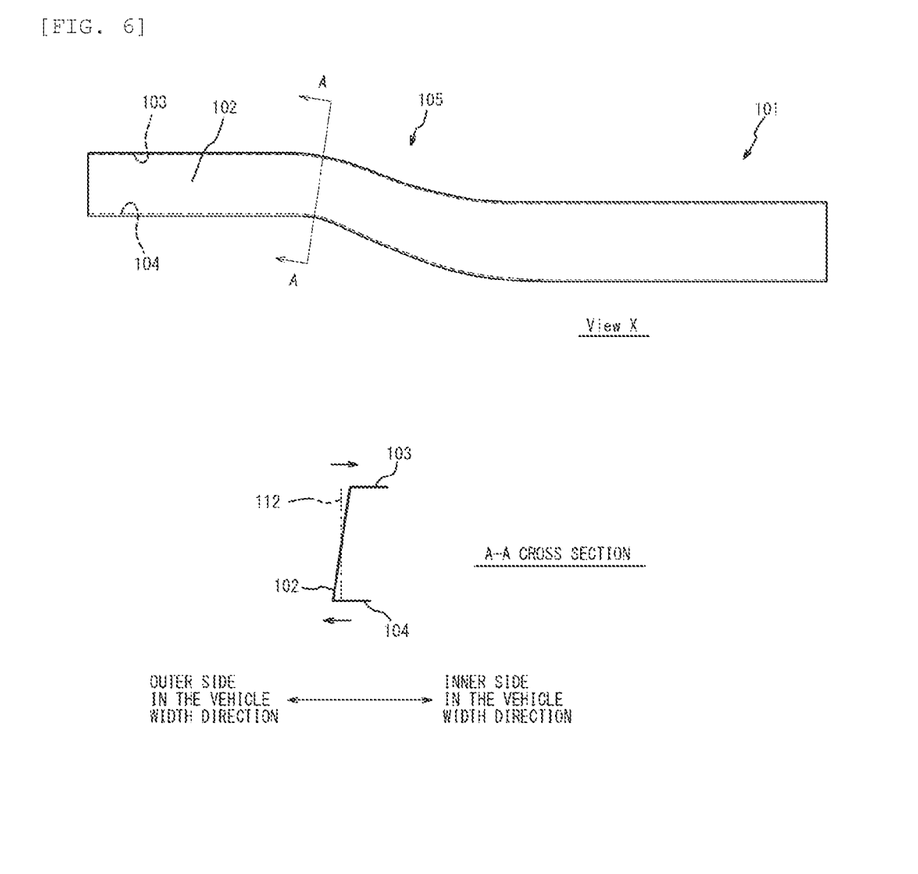
FIG. 6 is a diagram for explaining deformation of a conventional body frame member due to springback.

In this way, in the kick-up portion 105, a periphery of the upper flange 103 is deformed inward in the vehicle width direction, and a periphery of the lower flange 104 is deformed outward in the vehicle width direction. Therefore, in the body frame member 101 shown in FIG. 6, the cross-sectional shape of the kick-up portion 105 (cross-sectional shape along A-A) is in an inclined state with respect to the target shape 112. Note that FIG. 6 is an arrow view taken along the arrow X in FIG. 5A.

Figure 7:
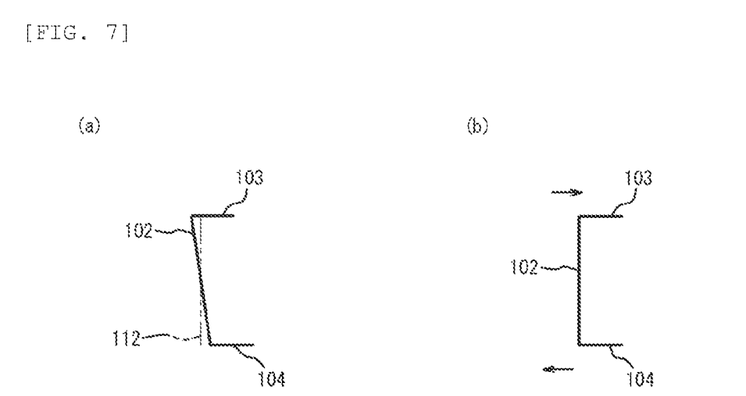
FIG. 7 is a diagram for explaining a conventional method of dealing with the deformation caused by the springback.

Conventionally, in order to obtain the target shape 112 from such an inclined state, the molding die of the body frame member 101 is provided with an inclination opposite to the direction of springback, and at the time of molding the web 102 is inclined as shown in FIG. 7A and then the springback occurs as shown in FIG. 7B, the target shape is obtained.

Figure 8:
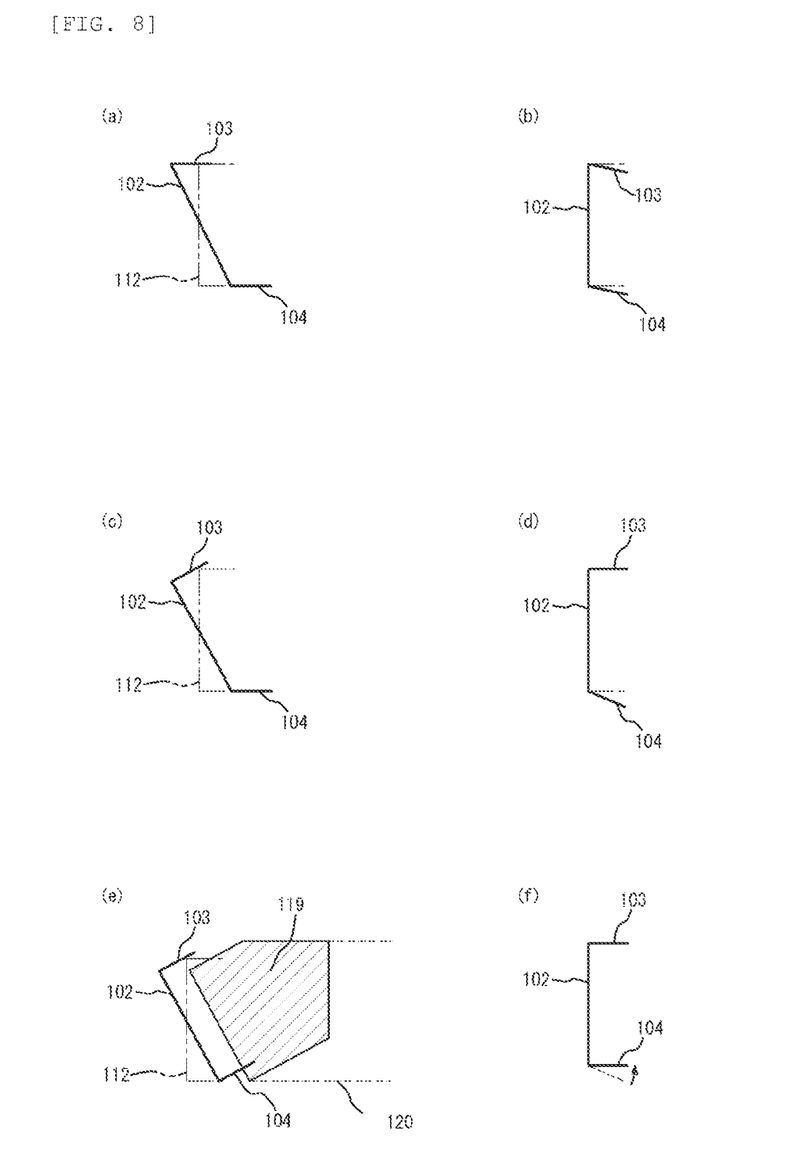
FIG. 8 is a diagram for explaining a problem regarding a conventional method of dealing with deformation caused by the springback.

However, in this method, when the amount of the springback increases due to, for example, improvement in the strength of the plate material used, it is necessary to increase the expected amount of the target shape applied to the molding die. As the amount of the springback increases, it becomes difficult to approach the target shape as expected, so that it takes time to prepare the molding die and the cost increases. Also, if the expected amount of springback exceeds the expected amount, even if the web 102 is inclined in the direction opposite to the springback direction as shown in FIG. 8A, the angles of the upper flange 103 and the lower flange 104 with respect to the web 102 are different from the target shape as shown in FIG. 8B. Note that, when the shape after molding is as shown in FIG. 8C, the shape of the upper flange 103 after springback can be brought closer to the target shape as shown in FIG. 8D. However, as shown in FIGS. 8C and 8D, the target shape of the lower flange 104 cannot be obtained. Also, if the lower flange 104 is also shaped in consideration of the springback, as shown in FIG. 8E, when a molding die 119 moves along a track 120, the molding die 119 and the lower flange 104 interfere with each other. Therefore, the lower flange 104 cannot be brought close to the target shape by such a method. Therefore, in order to bring the lower flange 104 closer to the target shape, it is necessary to add a step of bending the lower flange 104 after press molding, as shown in FIG. 8F.

Note that, conventionally, there is a known technique for suppressing or preventing the occurrence of the springback after press molding in a press-molded product having a curved bent portion (see JP 2013-202665 A). However, this technique is to provide a recess portion that is curved in an arc shape in the direction opposite to the bent portion, and the technical content is different from that of the body frame member 101 described above.

SUMMARY

The present invention aims to solve such conventional problems, and an object of the present invention is to provide a body frame member capable of suppressing deformation due to springback, and a method for manufacturing the same.

The present invention is a body frame member formed in a substantially U shape by a web extending in a front-rear direction of a vehicle body, an upper flange extending inward in a vehicle width direction from an upper end of the web, and a lower flange extending inward in the vehicle width direction from a lower end of the web, and comprising a kick-up portion bent in a vertical direction of the vehicle body, wherein a convex portion protruding outward or inward in the vehicle width direction is integrally formed from the upper end to the lower end of the web at a portion of the web where the kick-up portion is provided.

Further, the present invention is a method for manufacturing a body frame member formed in a substantially U shape by a web extending in a front-rear direction of a vehicle body, an upper flange extending inward in a vehicle width direction from an upper end of the web and a lower flange extending inward in the vehicle width direction from a lower end of the web, and including a kick-up member bent in a vertical direction of the vehicle body, wherein the method comprises; a step of preparing a plate material, and a step of forming the web, the upper flange, the lower flange and the kick-up portion by bending the plate material into a substantially U shape by sandwiching the plate material between a pair of molding dies and press-molding the plate material, and integrally forming a convex portion protruding outward or inward in the vehicle width direction from the upper end to the lower end of the web at a portion of the web where the kick-up portion is provided.

It is preferable that one of the pair of molding dies is provided with a raised portion from the upper end to the lower end of the web at the portion of the web where the kick-up portion is provided, and an other of the pair of molding dies is provided with a recessed portion from the upper end to the lower end of the web at the portion of the web where the kick-up portion is provided, and by sandwiching the plate material between the pair of molding dies and press-molding the plate material, the convex portion is integrally formed from the upper end to the lower end of the web by the raised portion and the recessed portion.

According to the present invention, since deformation due to springback can be suppressed, a body frame member having a target shape can be obtained without adding another step. Therefore, it is expected that the manufacturing process and cost will be reduced as compared with the conventional method. Further, since the amount of springback is suppressed, it can be expected that the time required for making the molding die and the cost can be suppressed.

DETAILED DESCRIPTION

Hereinafter, an example in which the body frame member according to the present invention is embodied will be described with reference to the accompanying drawings.

Figure 1:
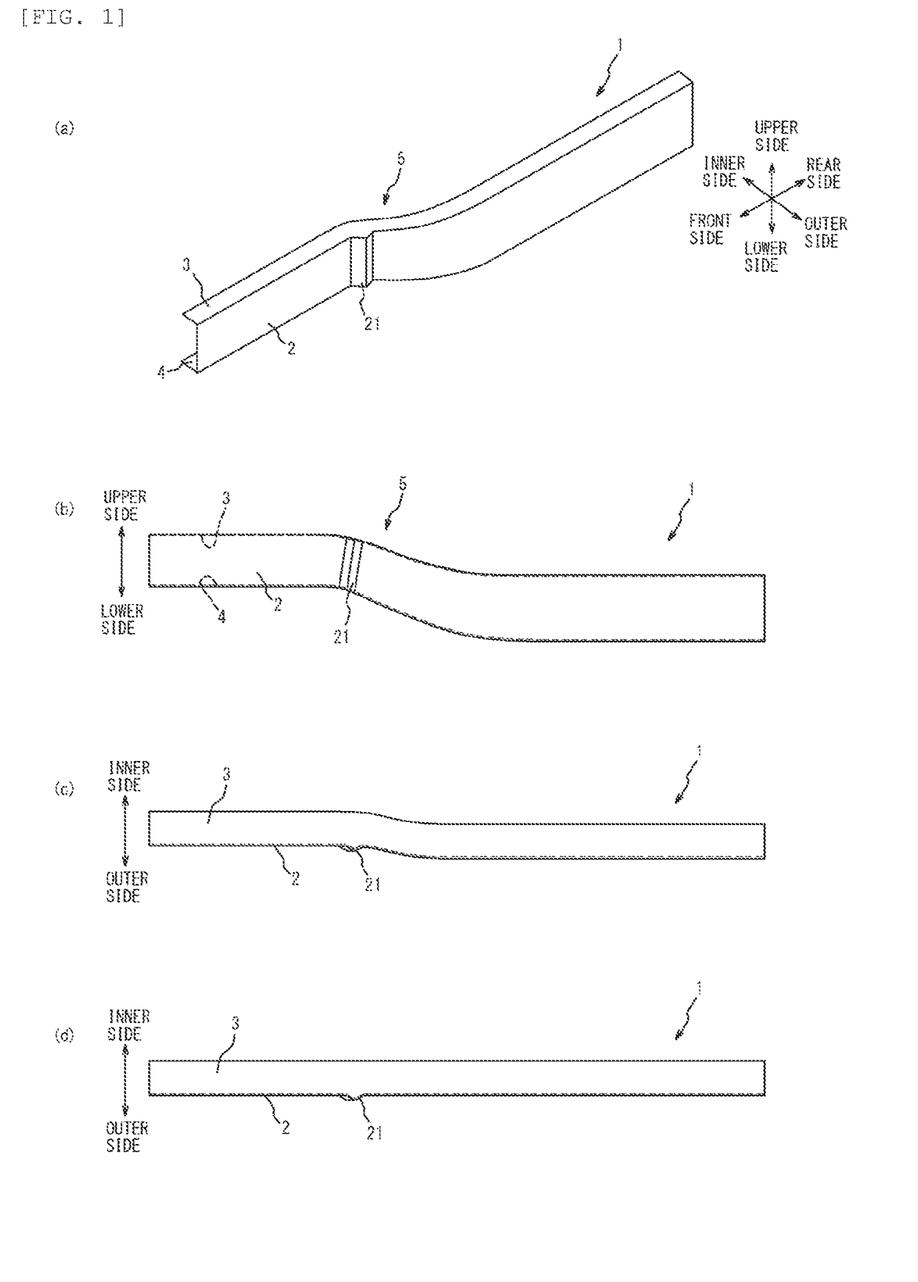
FIG. 1 is a diagram showing an embodiment of a body frame member according to the present invention.

FIG. 1 is a diagram showing an embodiment of a body frame member according to the present invention. As shown in FIG. 1A, a body frame member 1 of the present embodiment is formed in a substantially U shape by a web 2 arranged in a vertical direction and extending in a front-rear direction of a vehicle body, an upper flange 3 extending inward in a vehicle width direction from an upper end of the web 2, and a lower flange 4 extending inward in the vehicle width direction from a lower end of the web 2. Further, as shown in FIG. 1B, a kick-up portion 5 bent in the vertical direction of the vehicle body is provided at the intermediate portion in a length direction of the body frame member 1. In the body frame member 1 of the present embodiment, as shown in FIG. 1C, the web 2 is bent in a vehicle width inward and outward directions at the kick-up portion 5. The body frame member according to the present invention is not limited to the one shown in FIG. 1C, and as shown in FIG. 1D, the web 2 may not be bent in the vehicle width inward and outward direction at the kick-up portion 5 and may be in a straight shape.

As shown in FIGS., in the portion where the kick-up portion 5 is provided, a convex portion 21 protruding outward in the vehicle width direction is integrally formed on the web 2 from the upper end to the lower end of the web 2.

According to the body frame member 1 of the present embodiment, by providing such the convex portion 21, it is possible to suppress deformation due to springback as compared with the conventional body frame member 101 shown in FIG. 5. This point will be described with reference to FIG. 2.

FIG. 2A-1 is a perspective view from above of the body frame member 1 shown in FIG. 1, and FIG. 2B-1 is a perspective view from below. The body frame member 1 of the present embodiment is formed by sandwiching a plate material between a pair of molding dies and press-molding it, as described below. The plate material used in this embodiment is a blank material obtained by processing a flat plate-like material into a predetermined outer shape. By using the blank material, the work of cutting unnecessary parts around the press-molded material becomes unnecessary. The plate material used for the body frame member 1 is not limited to the blank material. Although not shown in FIGS., one of the pair of molding dies in the present embodiment is formed in a shape corresponding to the inner surface of the body frame member 1 in the vehicle width direction, and the other is formed in a shape corresponding to the outer surface of the body frame member 1 in the vehicle width direction. Further, on one side of the molding die, a raised portion is provided from the upper end to the lower end of the web 2 at a portion where the kick-up portion 5 of the web 2 is provided, and on the other side of the molding die, a recess portion is provided from the upper end to the lower end of the web 2 at a portion where the kick-up portion 5 of the web 2 is provided.

Figure 2:
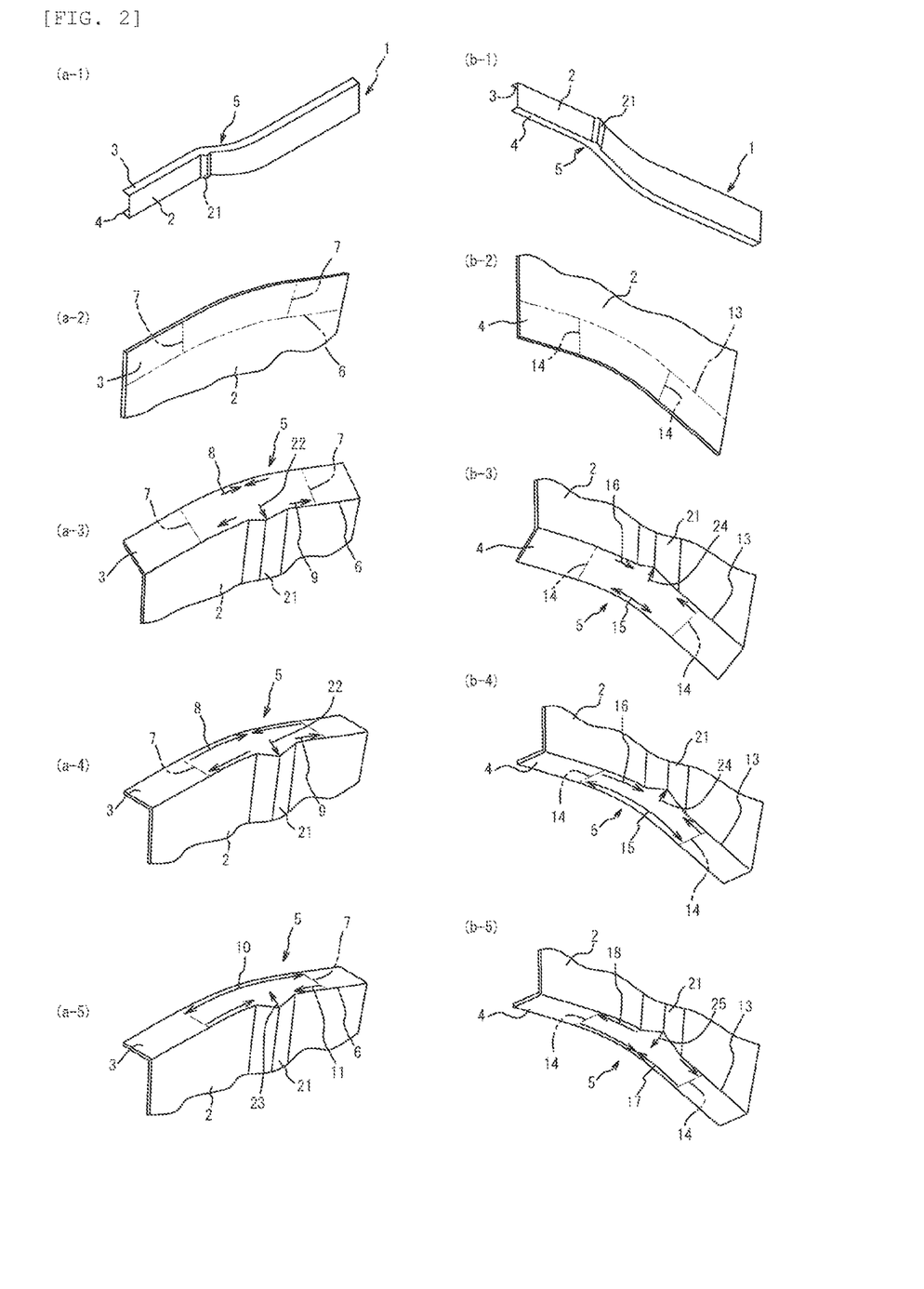
FIG. 2 is a diagram for explaining that the body frame member of FIG. 1 can suppress deformation due to springback.

FIG. 2A-2 shows a periphery of the kick-up portion 5 of the upper flange 3 in the state before the plate material is bent. When the plate material is sandwiched between a pair of molding dies from the state shown in FIG. 2A-2, the plate material begins to bend as shown in FIG. 2A-3, then as shown in FIG. 2A-4, the web 2, the upper flange 3, and the kick-up portion 5 are formed, and also the convex portion 21 is formed. In the FIGS., the sign 6 indicates a bent portion (a boundary portion between the web 2 and the upper flange 3), and the sign 7 indicates a flange surface change end portion in the upper flange 3.

When a member having a curved flange surface is formed in this way, as shown in FIG. 2A-4, a compressive stress 8 is generated at the flange end portion on the flange surface of the upper flange 3. Therefore, at the flange end portion, as shown in FIG. 2A-5, a springback 10 is generated outward in the longitudinal direction after molding. Further, as shown in FIG. 2A-4, a tensile stress 9 is generated between the flange surface change end portions 7 in the bent portion 6, but the stress 22 generated when the convex portion 21 is formed acts to divide the tensile stress 9. That is, in the conventional body frame member 101 shown in FIG. 5, although the springback 111 due to the tensile stress 109 was uniformly generated between the flange surface change end portions 107 in the bent portion 106, in the present embodiment, the springback 11 generated in the bent portion 6 inward in the longitudinal direction is divided by the springback 23 generated with the stress 22 and becomes smaller. Therefore, the deformation of the web 2 around the upper flange 3 in the vehicle width direction is suppressed as compared with the conventional body frame member 101 shown in FIG. 5.

And around the kick-up portion 5 on the lower flange 4, when the plate material is bent as shown in FIGS. 2B-3 and 2B-4 from the state shown in FIG. 2B-2, stress in the direction opposite to that of the upper flange 3 is generated. That is, when the boundary portion between the web 2 and the lower flange 4 is a bent portion 13 and the end portion of the lower flange 4 where the flange surface changes is the flange surface changing end portion 14 as shown in the FIGS., a tensile stress 15 is generated at the flange end portion on the flange surface of the lower flange 4. Therefore, at the flange end portion, a springback 17 is generated inward in the longitudinal direction as shown in FIG. 2B-5 after molding. Further, as shown in FIG. 2B-4, a compressive stress 16 is generated between the flange surface change end portions 14 in the bent portion 13, the stress 24 generated when the convex portion 21 is formed acts to divide the compressive stress 16. Therefore, as shown in FIG. 2B-5, the springback 18 generated in the bent portion 13 outward in the longitudinal direction is divided by the springback 25 generated by the stress 24 and becomes smaller than the conventional one. Therefore, the deformation of the web 2 around the lower flange 4 is suppressed as compared with the conventional body frame member 101.

As described above, according to the body frame member 1 of the present embodiment, deformation due to springback can be suppressed. Therefore, it is not necessary to add a step of modifying the target shape after press molding, so that the manufacturing process can be reduced, and the cost can be reduced. Further, since the amount of springback is suppressed, the time required for forming the molding die can be shortened as compared with the conventional case, and the cost can be suppressed.

Although the body frame member 1 described above includes the convex portion 21, the convex portion 26 as shown in FIG. 3A-1 may be provided instead of the convex portion 21. The convex portion 26 projects inward in the vehicle width direction at the portion of the web 2 where the kick-up portion 5 is provided, and is integrally formed from the upper end to the lower end of the web 2.

Figure 3:
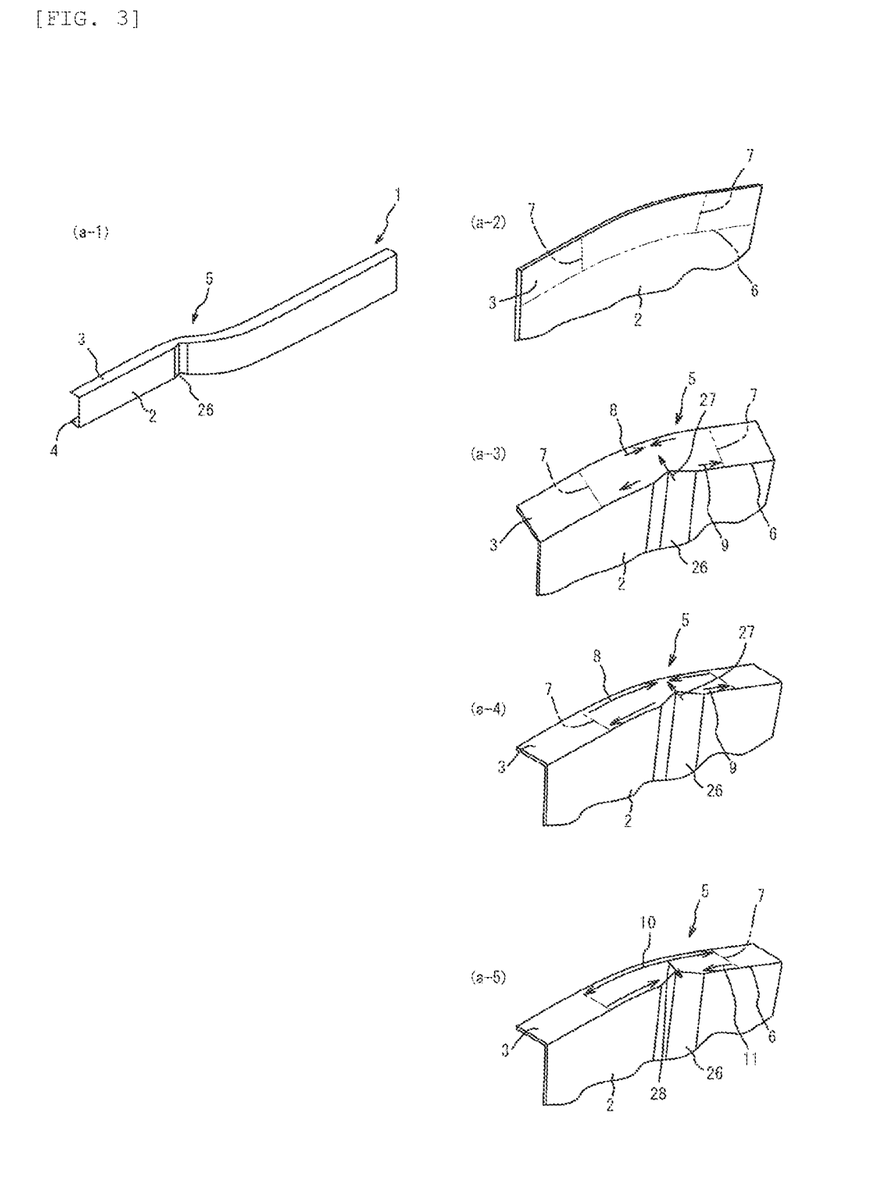
FIG. 3 is a diagram showing a modified example of the body frame member shown in FIG. 1.

The body frame member 1 provided with the convex portion 26 can also be formed in the same manner as that provided with the convex portion 21. That is, when the plate material is sandwiched between the pair of molding dies from the state of FIG. 3A-2, the plate material begins to bend as shown in FIG. 3A-3, and as shown in FIG. 3A-4, the web 2, the upper flange 3, and the kick-up portion 5 are formed, and also the convex portion 26 is formed. In this case as well, as shown in FIG. 3A-4, tensile stress 9 is generated between the flange surface change end portions 7 in the bent portion 6, but the stress 27 generated when the convex portion 26 is formed acts to divide the tensile stress 9. Therefore, as shown in FIG. 3A-5, since the springback 11 generated in the bent portion 6 inward in the longitudinal direction is also reduced by the springback 28 generated with the stress 27 in the same manner as the convex portion 21, deformation of the web 2 around the upper flange 3 in the vehicle width direction can be suppressed. Further, as in the case of the convex portion 21, when the convex portion 26 is provided, the deformation of the web 2 around the lower flange 4 can be suppressed.

Although one embodiment of the present invention has been described above, the present invention is not limited to the specific embodiment, and unless otherwise limited in the above description, various modifications and changes are possible within the scope of the gist of the present invention described in the claims. In addition, the effect in the above embodiment merely exemplifies the effect arising from the present invention, and do not mean that the effect according to the present invention is limited to the above effect.

Figure 4:
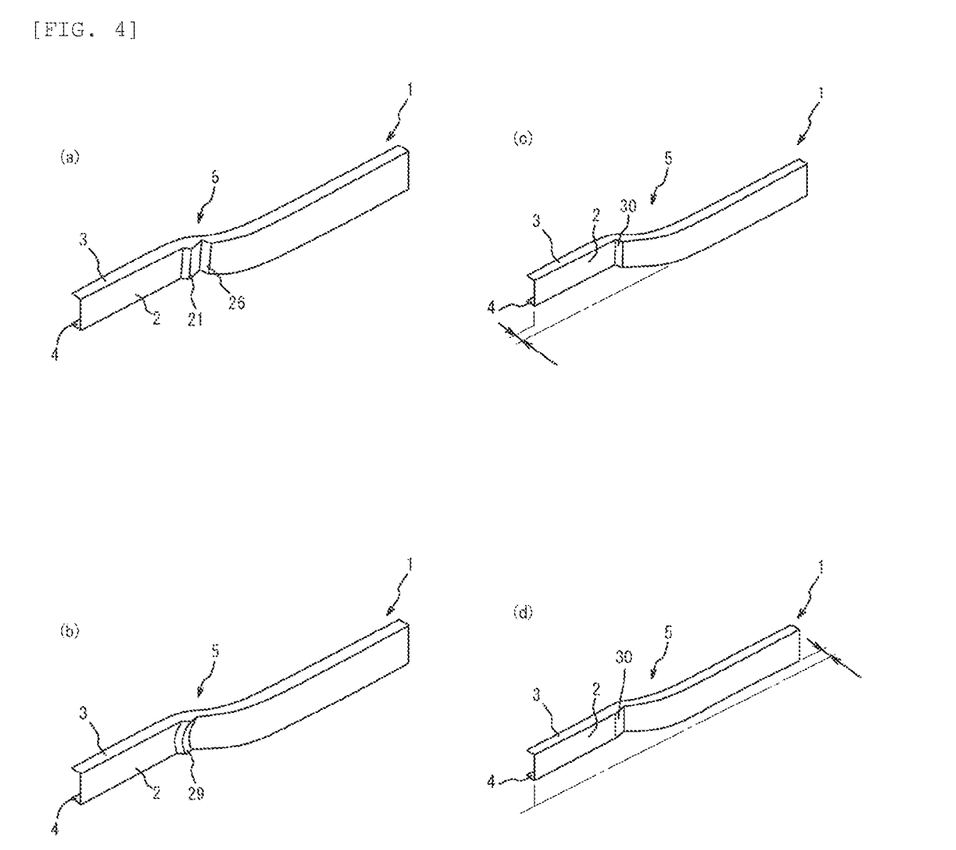
FIG. 4 is a diagram showing a further modified example of the body frame member shown in FIG. 1.

For example, a plurality of convex portions in the present invention may be provided as shown in FIG. 4A. In FIG. 4A, the convex portion 21 and the convex portion 26 are arranged without a gap, but a gap may be provided between the two. Further, as in the convex portion 29 shown in FIG. 4B, the convex portion 29 may extend so as to be curved instead of extending linearly in the vertical direction. Further, as shown in FIGS. 4C and 4D, when an offset portion 30 in which the position of the web surface on the web 2 changes outward or inward in the vehicle width direction is provided, the offset portion 30 can function as the convex portion described above.

REFERENCE SIGNS LIST 1 body frame member
2 web
3 upper flange
4 lower flange
5 kick-up portion
21 convex portion

What is claimed is:

1. A body frame member formed in a substantially U shape by a web extending in a front-rear direction of a vehicle body, an upper flange extending inward in a vehicle width direction from an upper end of the web, and a lower flange extending inward in the vehicle width direction from a lower end of the web, and comprising a kick-up portion provided at an intermediate portion of the vehicle body frame member in the front-rear direction of the vehicle body, wherein the kick-up portion includes one portion where the web, the upper flange, and the lower flange are bent in such a way that they have a convex shape in an upward direction, and another portion where the web, the upper flange, and the lower flange are bent in such a way that they have a convex shape in a downward direction, and wherein in the kick-up portion, a single convex portion protruding outward or inward in the vehicle width direction is integrally formed across the upper flange, the web, and the lower flange as a result of press-molding causing deformation of the upper flange, the web, and the lower flange, the single convex portion being elongated in the upward direction and extending in the upward direction from the lower end of the web to the upper end of the web, and wherein a length of the single convex portion in the upward direction is greater than a width of the single convex portion in the front-rear direction.

* * * * *